United States Patent
Scott et al.

(10) Patent No.: US 7,720,364 B2
(45) Date of Patent: May 18, 2010

(54) TRIGGERING DATA CAPTURE BASED ON POINTING DIRECTION

(75) Inventors: James W. Scott, Cambridge (GB); Ignas Budvytis, Vilnius (LT); Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/022,815

(22) Filed: Jan. 30, 2008

(65) Prior Publication Data

US 2009/0190914 A1    Jul. 30, 2009

(51) Int. Cl.
  *G03B 17/00* (2006.01)
  *G05B 11/01* (2006.01)
(52) U.S. Cl. ............... 396/50; 396/263; 700/13
(58) Field of Classification Search .............. 396/50, 396/310, 311, 263, 322; 700/13; 348/36–39, 348/231.99, 231.3
See application file for complete search history.

(56) References Cited

U.S. PATENT DOCUMENTS

| | | | |
|---|---|---|---|
| 4,772,945 A | | 9/1988 | Tagawa et al. |
| 4,801,793 A | * | 1/1989 | Vaynshteyn ............ 396/50 |
| 5,128,769 A | | 7/1992 | Arai et al. |
| 5,745,175 A | | 4/1998 | Anderson |
| 6,034,716 A | | 3/2000 | Whiting et al. |
| 7,116,353 B2 | | 10/2006 | Hobson et al. |
| 7,304,681 B2 | | 12/2007 | Larner et al. |
| 2003/0218677 A1 | | 11/2003 | Nishimura |
| 2004/0114054 A1 | | 6/2004 | Mansfield et al. |
| 2005/0185711 A1 | | 8/2005 | Pfister et al. |
| 2005/0203430 A1 | | 9/2005 | Williams et al. |
| 2006/0050982 A1 | * | 3/2006 | Grosvenor ............ 382/255 |
| 2006/0083403 A1 | * | 4/2006 | Zhang et al. ........... 382/100 |
| 2006/0203101 A1 | | 9/2006 | Silsby |

FOREIGN PATENT DOCUMENTS

EP    1793580 A1    6/2007

OTHER PUBLICATIONS

"The Microsoft SenseCam and Other Lifelogging Devices", at <<http://www.researchchannel.org/prog/displayevent.aspx?rID=19796&,fID=4568>>, 2007, pp. 1-2.
Yi, et al., "Fast Pixel-Based Video Scene Change Detection", pp. 1-4.

* cited by examiner

*Primary Examiner*—W. B. Perkey
*Assistant Examiner*—Minh Q Phan
(74) *Attorney, Agent, or Firm*—Lee & Hayes, PLLC (57) ABSTRACT

Methods and apparatus for triggering directional data capture based on pointing direction are described. In an embodiment, the data captured is an image and a camera is described which includes a sensor for detecting the direction in which the image sensor of the camera is pointing. When the sensed pointing direction is one in which a worthwhile image is likely to be taken, the camera is triggered to capture a new image. The determination of when to capture a new image uses a metric based on the sensed direction and one or more specified trigger conditions.

15 Claims, 10 Drawing Sheets

TRIGGERING DATA CAPTURE BASED ON POINTING DIRECTION

BACKGROUND

Cameras have been developed which will automatically take photographs when particular conditions are satisfied, such as when a change in light level is detected or at particular time intervals. An example of such a camera is SenseCam, developed by Microsoft Research. There are many applications for SenseCam including use as a memory recall aid by enabling a user to browse through images of events experienced by a wearer of the device and use to create autobiographical media for sharing with friends.

In order that viewing the images captured automatically by such a camera is informative and to most effectively use the available memory and battery power of the camera, the captured images should be representative of events experienced by a wearer and should avoid undue repetition (i.e. the camera should avoid capturing multiple identical or very similar images). Existing devices enable capture conditions to be set based on inputs from accelerometers, passive infrared sensors or light sensors.

Image processing may be used to delete or hide images which are identical or very similar. However, such techniques are processor and power intensive and this therefore limits the applicability of such techniques to battery powered devices. Furthermore, whilst such techniques may be applied to adjacent images in a sequence of images, comparing large numbers of images may become computationally infeasible for a device with modest processing capabilities. Additionally, it is difficult to assess the similarity of images using existing image processing techniques where lighting changes or objects move and therefore such techniques, even where implemented, may not be particularly effective.

The embodiments described below are not limited to implementations which solve any or all of the disadvantages of known image capture devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for triggering directional data capture based on pointing direction are described. In an embodiment, the data captured is an image and a camera is described which includes a sensor for detecting the direction in which the image sensor of the camera is pointing. When the sensed pointing direction is one in which a worthwhile image is likely to be taken, the camera is triggered to capture a new image. The determination of when to capture a new image uses a metric based on the sensed direction and one or more specified trigger conditions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
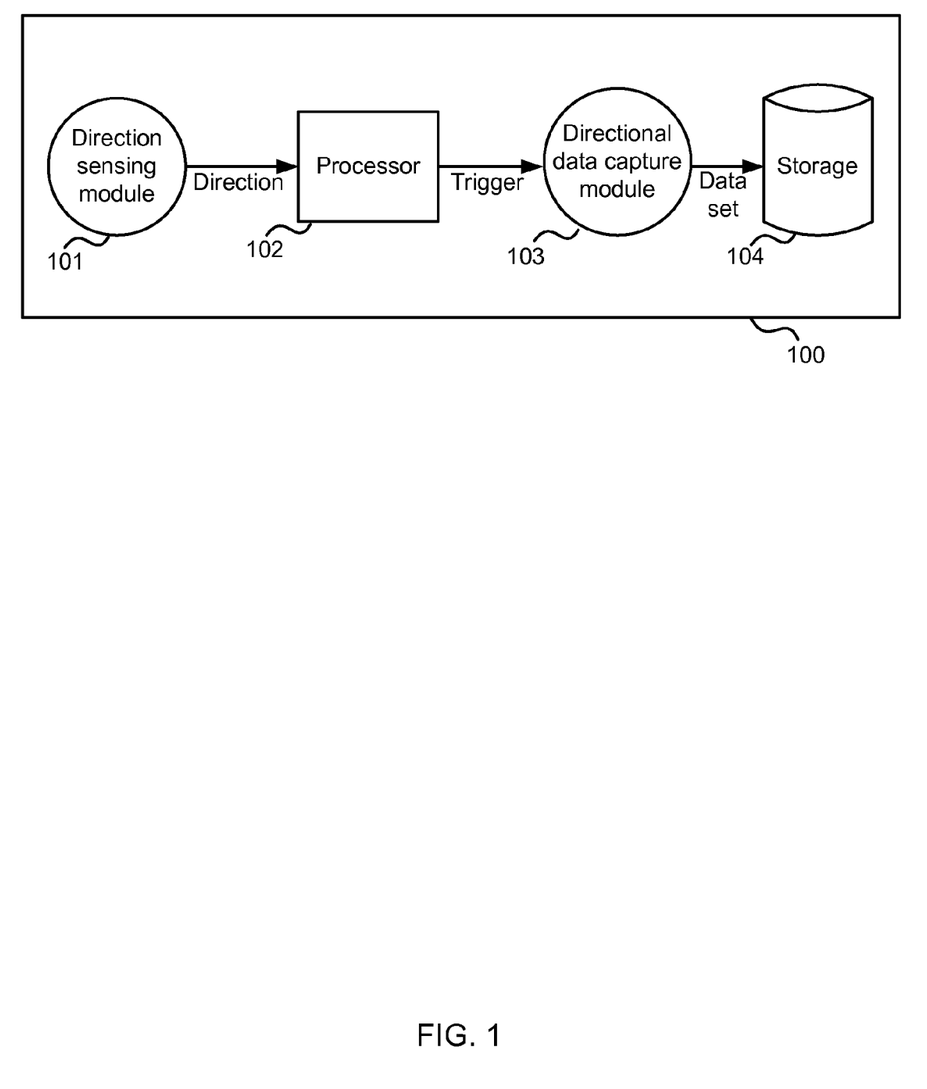
FIG. 1 is a schematic diagram of a directional capture device which determines whether to capture data based on the pointing direction of the device.

FIG. 1 is a schematic diagram of a directional capture device 100 which determines whether to capture direction-sensitive data based on the pointing direction of the device. The operation of the device is shown in an example flow diagram in FIG. 2 and data passing between the components of the device is indicated by labeled arrows in FIG. 1. When the capture device is pointing in a new direction, any data captured is more likely to be new (i.e. contain new information not present in previous captured data) whilst if the pointing direction of the device does not change, capturing multiple sets of data may lead to repetitive captured data.

Figure 2:
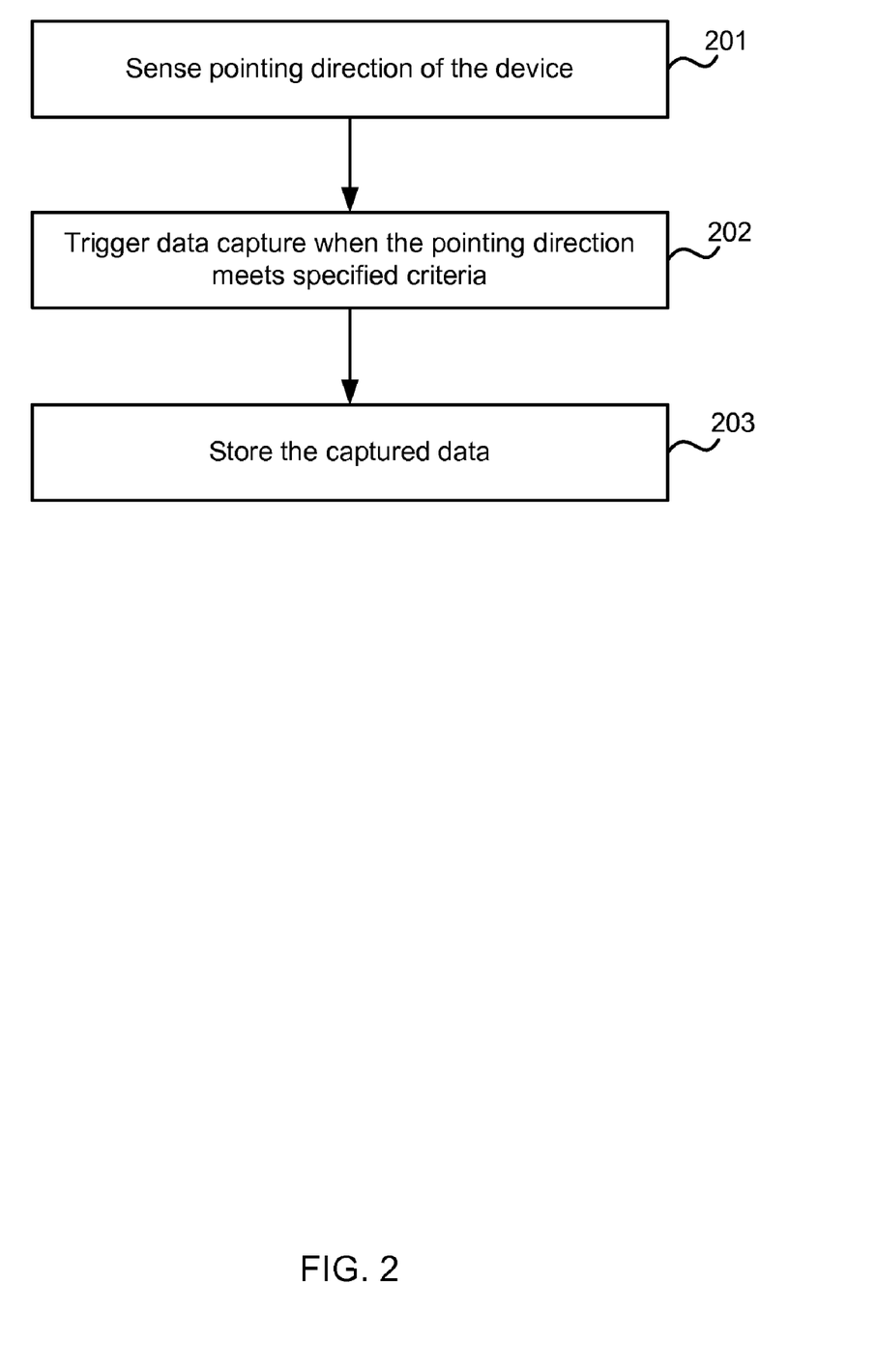
FIG. 2 is a flow diagram of an example method of operation of a directional capture device.

The directional capture device 100 comprises a direction sensing module 101, a processor 102, a directional data capture module 103 (also referred to as a 'direction-sensitive' or 'direction-specific' data capture module) and storage 104. The direction sensing module 101 detects the pointing direction (or orientation) of the device (block 201) and provides direction information to the processor 102. The processor 102 analyzes the direction information received and triggers data capture, by the directional data capture module 103, when the pointing direction information meets specified criteria (block 202). Having captured the data it is stored (block 203) in the storage 104. The data captured by the directional data capture module may be referred to as a 'data set'.

In an example, the directional capture device may comprise an image capture device, the directional data capture module 103 may comprise an image capture module and the storage 104 may comprise an image store. In the following description, an image capture device is described in detail by way of an example. It will be appreciated, however, that other types of data may be captured by a directional capture device.

The term 'pointing direction' is used herein to refer to the central capture direction of the directional data capture module 103 (e.g. the direction from the directional capture device to the centre of the field of view when the directional data capture module 103 is an image capture module). The pointing direction may correspond to the physical direction in which the directional capture device is pointed; however, where the directional capture device 100 includes steerable optics or digital processing techniques such that the central capture direction can be moved, the pointing direction may not correspond to a physical pointing direction of the directional capture module.

The direction sensing module 101 may be any sensing apparatus which is capable of determining direction, such as a compass, one or more magnetometers (e.g. a 2D or 3D magnetometer), a GPS (global positioning system) receiver etc. In other examples, the direction sensing module 101 may use other techniques to determine the pointing direction of the device, for example using a wireless receiver (which may comprise an antenna array) to determine the orientation of the device with respect to received wireless signals. Such a technique may use beam steering techniques or directional antennas to determine the angle of arrival of signals. In such an example, these wireless signals are transmitted from known locations or known directions and may, for example, be beacons emitted by cellular base stations.

In some examples, the direction sensing module 101 may comprise an accelerometer in addition to the direction sensor (e.g. a 2D accelerometer in addition to a 2D magnetometer). Use of an accelerometer may be used to correct for any tilting of the image capture device 100 and may be particularly appropriate where the device is not mounted on a fixed device or in a fixed orientation (e.g. where the device is worn by a person or animal). The accelerometer may also be used to sense motion, as described in more detail below.

The direction sensing module 101 may detect the pointing direction directly or may detect a direction from which the pointing direction can be inferred. For example, the direction sensing module 101 may detect the orientation of the directional capture device 100 and from this deduce the pointing direction. There may be a fixed relationship between the pointing direction and the orientation of the directional capture device or the relationship may be variable (e.g. where the field of view can be moved, as described above).

The processor 102 is arranged to analyze the direction data provided by the direction sensing module 101 and to trigger data capture when certain conditions are specified. The processor 102 may, for example, comprise a microprocessor or microcontroller. The trigger conditions may be specified in terms of a change in pointing direction (e.g. when a change in pointing direction exceeds a defined threshold) or may use any other suitable metric which is related to pointing direction. Further examples of trigger conditions are described in more detail below. The trigger conditions may be based on other factors in addition to pointing direction, such as position data, accelerometer data etc.

The directional data capture module 103 (also referred to as a 'direction-sensitive' or 'direction-specific' data capture module) may be any module which is capable of capturing data that is in some way differs depending on a pointing direction, i.e. any capture module which is not fully omnidirectional. This data may comprise an image, a sequence of images (e.g. video sequences), an audio signal, brightness, wavelength etc and the data capture module 103 may, for example, comprise an image capture module (such as a camera module), a video capture module, a directional brightness sensor, a directional microphone, a directional spectroscopy module, or any other direction specific sensor. In most of the implementations where the data capture module comprises an image capture module, the image will be captured digitally (e.g. using a light-sensitive sensor such as a CCD image sensor or CMOS chip) and stored in memory (i.e. in image store 104); however, in some implementations, a traditional camera module may be used and in such an implementation, the storage 104 may comprise the photographic film/plate used to capture the image. The image capture module may comprise a lens in addition to the image sensor (or photographic film/plate). The lens may, for example, be a wide angle or fish eye lens such that the image captures a wide viewing angle. The image capture module may also comprise additional optics and/or electronics. Where the data capture module 103 is not an image capture module, the module may also comprise a lens, optics, electronics or data processing elements.

The storage 104 may be any element capable of storing data. In the image capture example, the storage 104 may store digital images or analogue images. The storage may be volatile or non-volatile. Whilst the storage 104 is shown within the device 100, it will be appreciated that in some implementations, the captured data (e.g. a captured image) may be transmitted to a remote store (e.g. over a wireless link to networked storage or to a networked computing device).

It will be appreciated that the individual components shown in FIG. 1 are logical components. Each of the components may be constructed in hardware, firmware or software and one or more of the logical components may be combined in any way. Only those elements of the directional capture device which are necessary for the purposes of the above explanation are shown in FIG. 1 and the directional capture device 100 may also comprise other elements (such as a battery) which are not shown in FIG. 1. Whilst FIG. 1 shows some of the data flow between individual components, this is shown by way of example only and the data may flow in a different route or there may be additional data flow. Furthermore, the communication between components may be unidirectional or bidirectional and the single ended arrows shown in FIG. 1 do not imply that the communication is necessarily unidirectional.

In the above description, the determination of when the pointing direction information should trigger the capture of data, such as a new image, is performed on the directional capture device 100. However, in some implementations, the direction data may be transmitted to another device which may make the determination and then, when appropriate, send a signal back to the capture device to trigger the capture of data (e.g. capture of another image). In a first example, the determination may be performed by a desktop computer associated with the directional capture device and the computer and the device may communicate over a wireless link (e.g. using IrDA, WiFi, WiMax or Bluetooth). In a second example, the determination may be performed by a networked computer (e.g. a server) and the directional capture device may communicate with the networked computer over a network (e.g. over the internet, an intranet or a local area network).

In FIG. 1, the direction sensing module 101 is shown within the directional capture device 100; however in some embodiments, the direction sensing module may be external to the device. For example, the device may emit a directional signal which is detected by receivers at known locations (and which may be fixed). The detected signals from one or more receivers may be used by a direction sensing module external to the device to determine the pointing direction of the device. The pointing direction may then be transmitted back to the capture device or may be transmitted to the device which determines when to trigger data capture, which may itself be external to the capture device (as described above). The direction information provided by the external direction sensing module may not be the pointing direction itself but may be a direction from which the pointing direction can be inferred (e.g. the direction information may relate to the orientation of the directional capture device).

Figure 3:
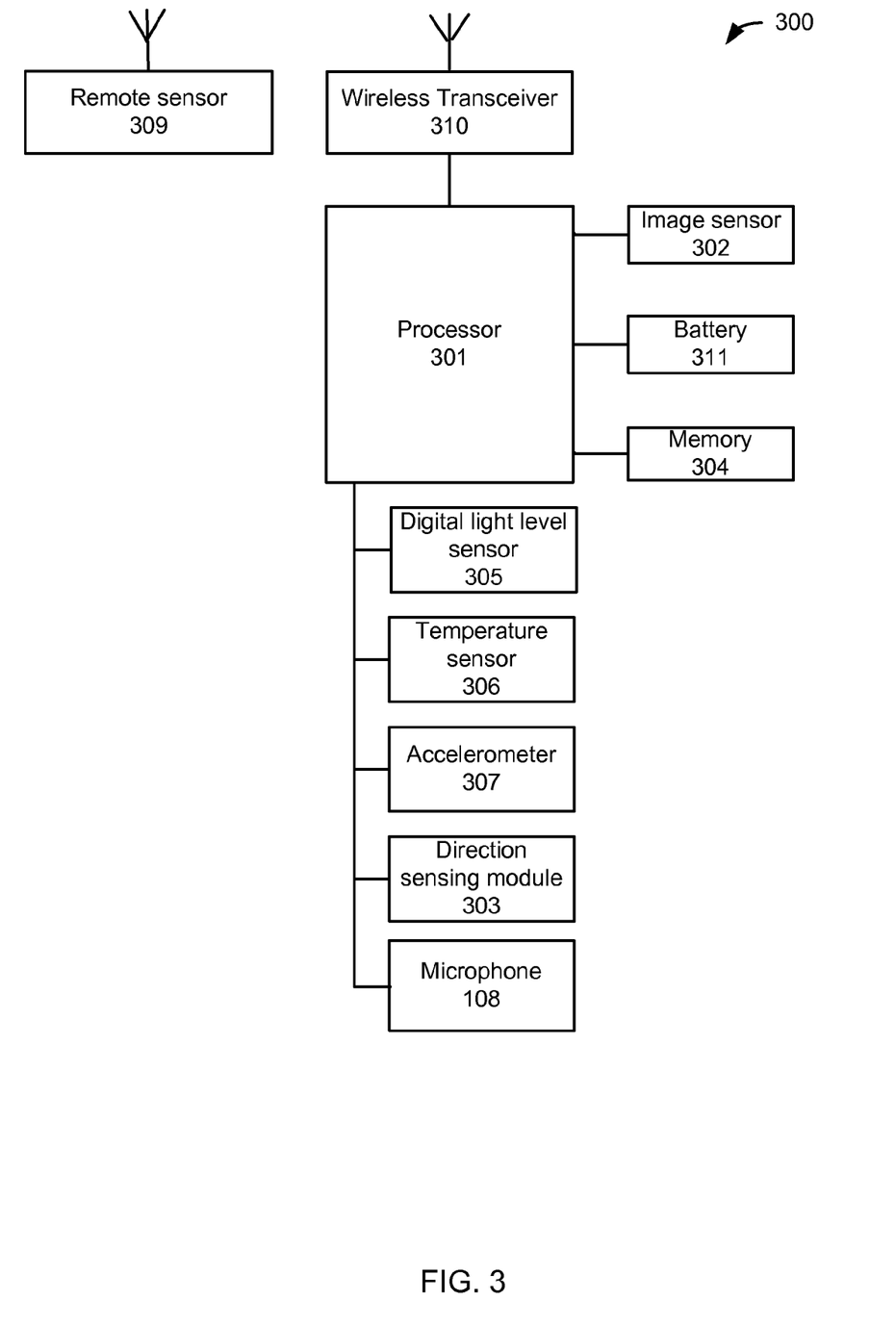
FIG. 3 is a schematic diagram of an image capture device.

In addition to triggering data capture based on the detected pointing direction (as described above), the directional capture device may also trigger based on other sensor data or may trigger based on a combination of pointing direction and other sensor data. FIG. 3 shows a schematic diagram of an example image capture device 300 which includes various sensors which may be integrated within and/or remote from the device. The device 300 comprises a processor 301, an image sensor 302, a direction sensing module 303 and memory 304. The image sensor 302 is capable of capturing an image and the memory 304 provides a store for the images and may also store other information, such as details of trigger conditions. The device 300 also comprises a number of other sensors 305-309 such as a light level sensor 305, temperature sensor 306, accelerometer 307 and microphone 308. The sensors may be integrated within the device or may be remote (e.g. remote sensor 309). Any remote sensors may communicate with the device over wired or wireless links (e.g. via wireless transceiver 310 in the example of FIG. 3). The device 300 may also comprise a battery 311 which powers the device.

As described above, the triggering process (block 202) may use any metric based on pointing direction. For example, the capture of an image (or other data) may be triggered when the pointing direction changes by an amount (e.g. an angle) which exceeds a defined threshold (e.g. 10°). The threshold set may depend upon the lens (where present) within the image capture module 103 or on the viewing angle of the captured images (e.g. for wide angle lenses the threshold may be higher than for narrower angle lenses). Other examples of metrics and triggering conditions are described below using an image capture device as an example of a directional capture device.

In a second example, the trigger condition may be a particular pointing angle (or range of pointing angles) such that data capture (e.g. image capture) is triggered when the capture device is pointing in the required direction. The trigger conditions may include location criteria, in addition to the pointing direction criterion, such that data capture is triggered when the capture device is in a defined location and pointing in a defined direction. This may, for example, be used in an image capture device to automatically capture views which are of significance. The trigger conditions may be stored on the capture device or may be received via a wireless signal, such as from a beacon which may be placed at a point of interest. In an example, a user may download the trigger conditions from a web server, such as Microsoft® Virtual Earth™, to the capture device.

In another example, an array structure may be used to record the angles at which images (or other data, where the directional capture device is not an image capture device) have been captured already and to determine whether to trigger the capture of a new image. This array structure may comprise a value stored for each compass direction (which may be quantized, e.g. by 1° or 10°) which provides an indication of how many of the previously captured images (if any) have captured a particular pointing direction. The size of the value may be limited (e.g. to four bits) to provide a fixed size array. The size of the array structure may be selected to be small (e.g. 100×4 bits) in order to minimize the required memory for storing the array structure and/or to minimize the processing required to analyze and/or update the array structure. The size of the array will be influenced by the quantization of each of the compass direction and the stored value (or vice versa).

Figure 4:
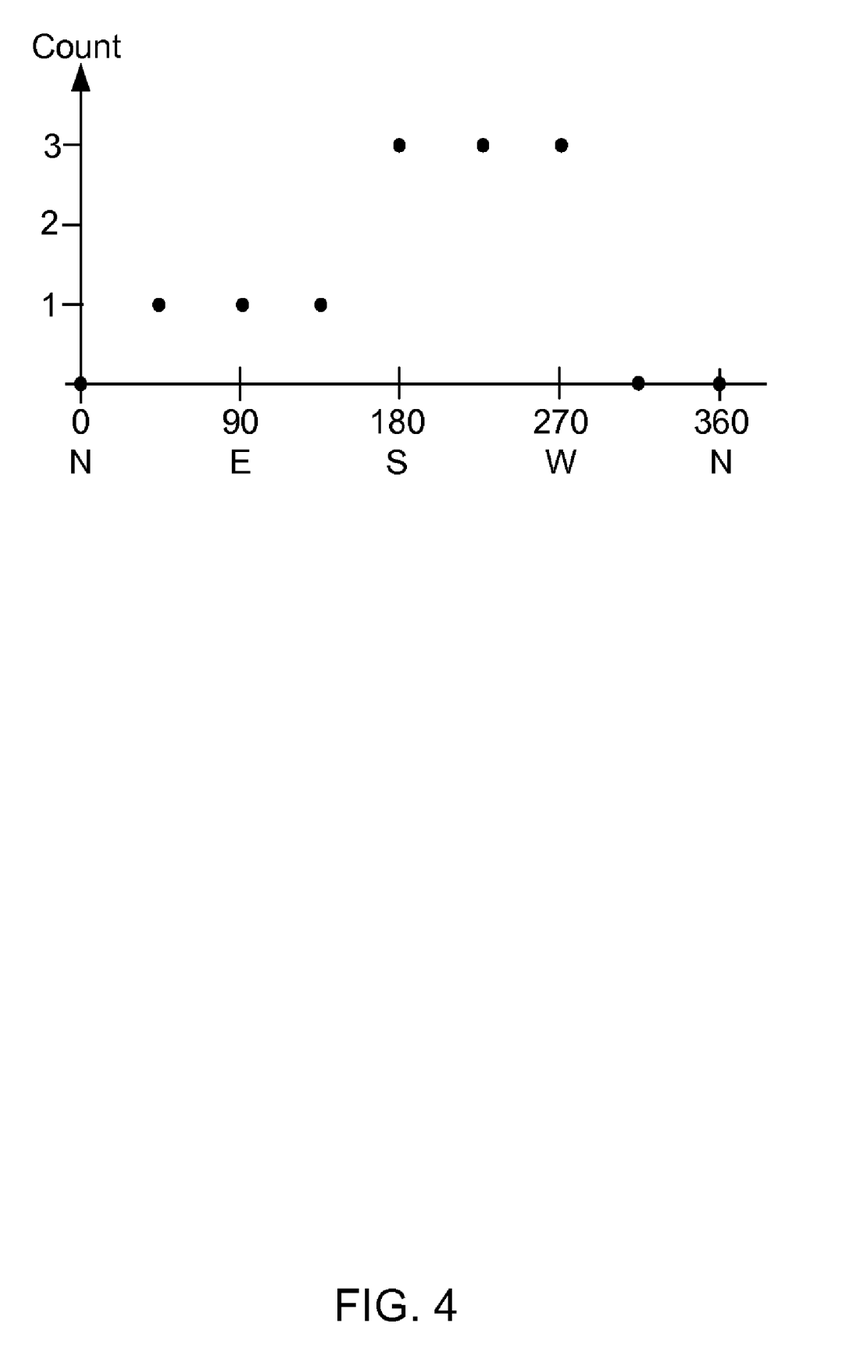
FIGS. 4 and 5 show graphical representations of data structures used to store data relating to previously captured images.

In a simple example, initially all values in the data structure may be zero (i.e. before any images have been captured) and the value for a particular angle may be increased by one for each image taken at a pointing direction which corresponds to that angle, as shown in the graph of FIG. 4. In this example, the compass direction is quantized in steps of 45° and the graph shows that three images have been taken at each of angles 180°, 225° and 270°, one image has been taken at each of angles 45°, 90° and 135° and no images have been taken at pointing angles of 315° and 0° (=360°). In such an example, triggering conditions may be specified such that an image is captured for angles (which correspond to the pointing direction) where the count is less than three. This would mean that images would be captured for pointing directions in the range 315°-135° but not where the pointing direction was outside this range.

Figure 5:
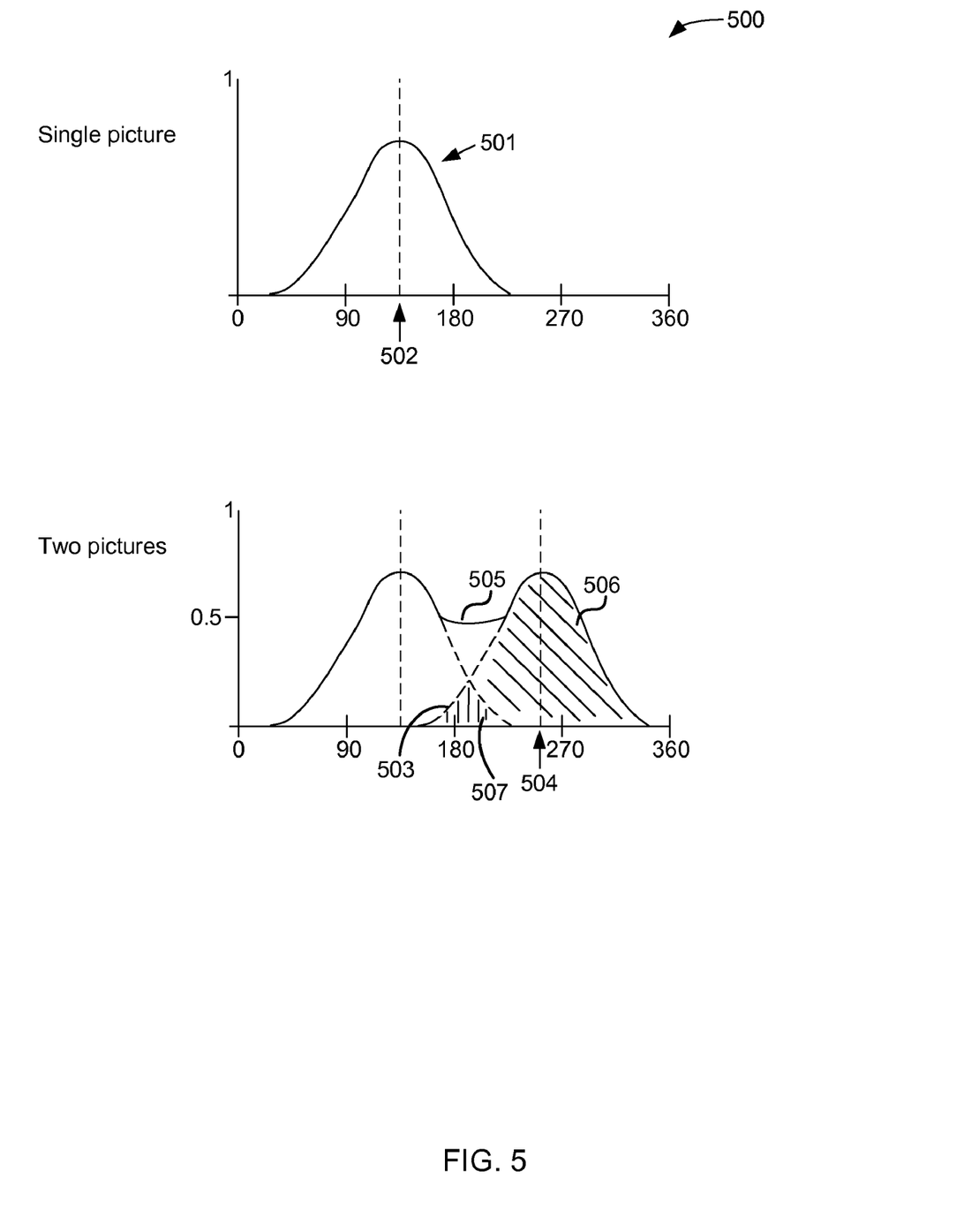

In the example of FIG. 4, a single count at a single angular value is added for each image which has been captured and the content of the data structure comprises the sum of these counts. However, as an image is likely to cover a range of viewing angles, more complex distributions may be used, such as a Gaussian distribution, as shown in FIG. 5, with the content of the data structure being the sum of the individual distributions. FIG. 5 shows a graphical representation 500 of an array structure after one image has been taken. The representation shows a distribution 501 centered around the pointing direction when the image was captured (indicated by arrow 502). The shape of the distribution 501 used may be related to the properties of the image capture module (e.g. the properties of the image sensor and any lens) such that it relates to the number of pixels taken in each compass direction (i.e. the field of view of the image capture module). The pixels at the centre of a captured image (which correspond to angles which are closer to the pointing direction) may be given more weight (as represented by more amplitude in the distribution 501) as a viewer tends to value content found in the center of an image and pay less attention to the periphery. Alternatively, a more square (e.g. top hat) distribution or any other distribution may be used. When a second image is captured, a second distribution 503 may be added to the array, centered on the new pointing direction for that second image (indicated by arrow 504), giving the cumulative result 505 (i.e. the sum of the two distributions). In such an example, triggering conditions may be specified such that an image is captured for pointing directions where the value stored in the array structure is less than a defined value (e.g. less than 0.5).

In another example, the maximum value for any angle in the array may be limited (e.g. to three in the example of FIG. 4 and to one in the example of FIG. 5) and triggering conditions may be specified such that an image is captured where the additional area under the curve (in a graphical representation of the array structure) which would result from capture of an image exceeds a defined amount. In the example of FIG. 5 the area 506 added due to capture of the second image is shown by diagonal shading. Subsequent to the capture of the second image, such triggering conditions might lead to triggering image capture at angles of 315°-90° but not for other pointing directions.

In a further example, the triggering conditions may be specified according to the overlap of the existing distribution (as stored in the array structure) and the single image distribution which would be added should an image be taken at a particular pointing angle. This overlap 507 between the distribution following the capture of the first image (as shown in representation 500) and the distribution for the second image is shown in FIG. 5 using vertical shading. A threshold of overlap may be specified (e.g. 50% overlap, i.e. where at most 50% of the new single image distribution overlaps with the existing distribution stored in the array structure) such that image capture would not be triggered for pointing directions in the range 90°-270° (where 100% overlap would occur at pointing angles which match those of either of the first two images captured and indicated by arrows 502 and 504) but image capture would be triggered for other pointing directions.

Figure 6:
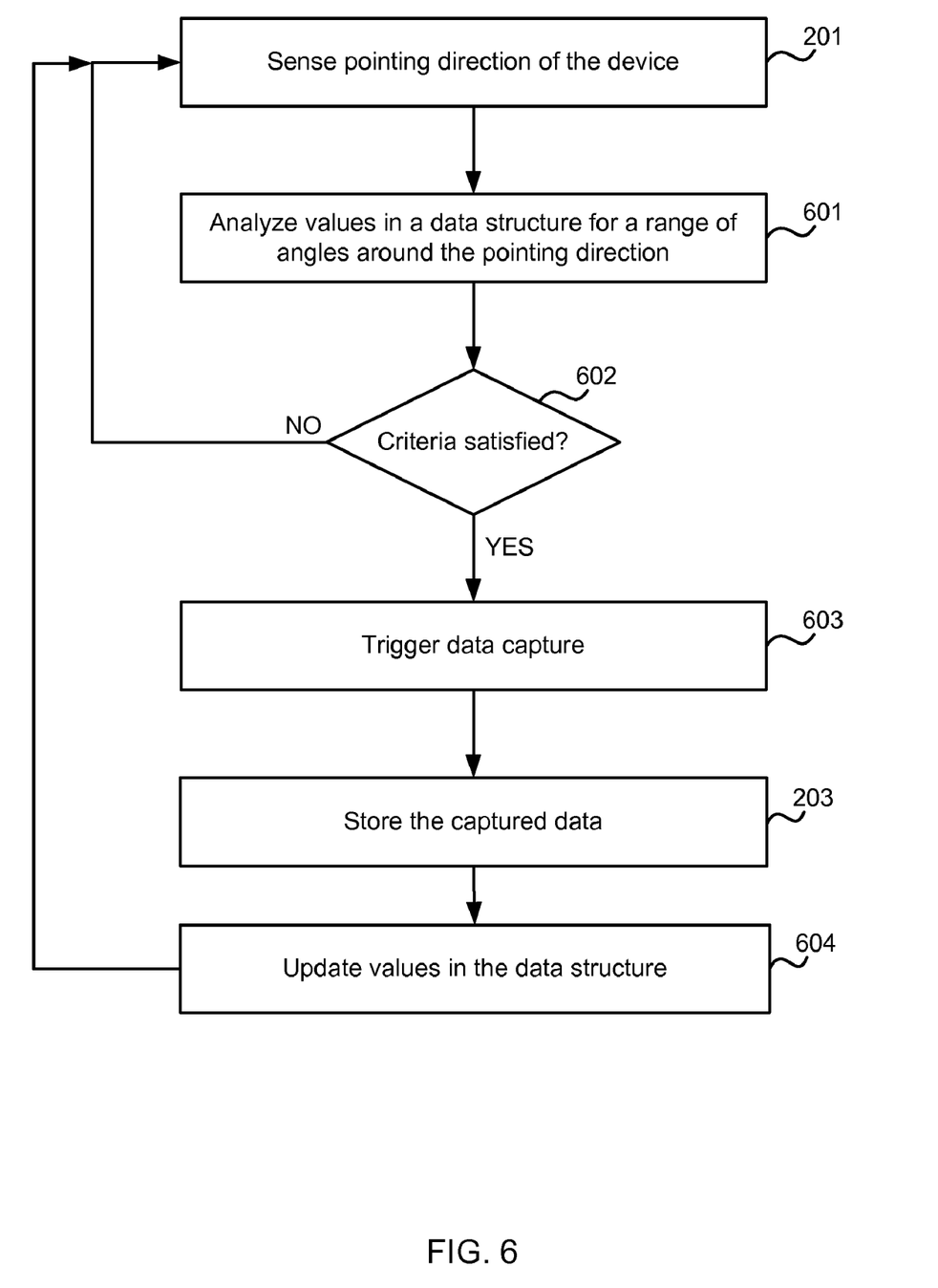
FIG. 6 is a flow diagram of another example method of operation of a directional capture device.

FIG. 6 shows a flow diagram of an example method of operating of a directional capture device (such as shown in FIGS. 1 and 3) which uses a data structure, such as the array described above, in the determination of when to trigger capture of data (such as an image). The pointing direction of the device is sensed (block 201) and values in the data structure for a range of angles around the sensed pointing direction are analyzed (block 601). This range of angles considered may be broad (e.g. ~180° as in the examples described above with reference to FIG. 5) or narrow (e.g. a single value as in the examples described above with reference to FIG. 4). The analysis may look at the absolute values in the data structure for the range of angles (e.g. using a threshold, as described above), an overlap with a new distribution (e.g. as described above with reference to FIG. 5), the effect on the values in the data structure which would result from capturing new data, such as an image, (as described above) or use any other technique. If the analysis determines that defined criteria (which may be referred to as 'trigger conditions') are satisfied ('Yes' in block 602), data capture is triggered (block 603) and the captured data (which may be an image) is stored (block 203). The data structure is also updated when data is captured (block 604) and this updating may occur before, after or substantially in parallel with the data capture.

The values stored in the data structure described may continue to accumulate. In some examples, however, the stored values may be reduced based on defined criteria. For example, it may be beneficial to reduce or reset the stored values periodically so as to enable data, such as a new image, to be captured in a particular pointing direction after a time interval during which time the view in that direction may have changed. This variation over time may have any form, such as a periodic reset (e.g. the values in the data structure are reset to zero periodically) or reset upon certain trigger events (e.g. the values in the data structure are reset to zero when motion of the directional capture device is detected). In another example, the distributions added to the data structure upon data capture may be removed after a period of time. For example, the distribution 501 resulting from the capture of the first image in the example shown in FIG. 5 may be deleted a fixed period of time after the capture of that image. The distribution 503 resulting from the capture of the second image may then be deleted subsequently, again after the fixed period of time from the second image's capture. In a further example, the values in the data structure described above may decay with time and this is described in more detail below.

Figure 7:
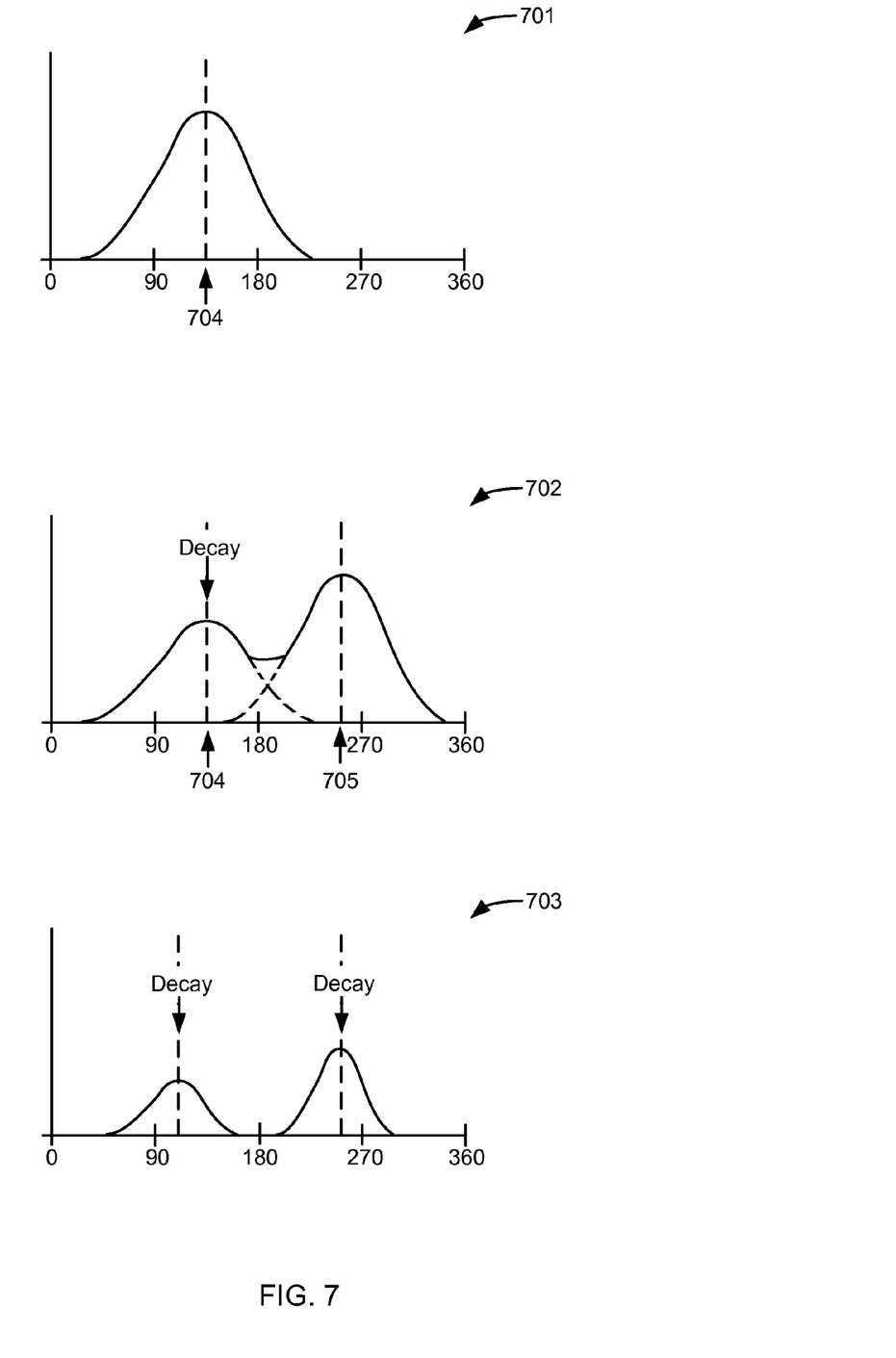
FIGS. 7 and 8 show graphical representations of data structures used to store data relating to previously captured images.

A graphical representation of the decay of values in the data structure is shown in FIG. 7, which shows three graphical representations of an array data structure. Initially (view 701) a single picture has been taken at a viewing angle indicated by arrow 704 and the data structure comprises a single distribution. When a second picture is taken subsequently (view 702) at a viewing angle indicated by arrow 705, the distribution of the initial picture has already decayed (and therefore the peak of the distribution in the array is lower than immediately following the first image's capture) and the distribution corresponding to the second image is added to this decayed distribution. A period of time later (view 703), the combined distribution of the two pictures has decayed.

In the example shown in FIG. 7, the values in the array decay linearly with time. In other examples, the values may decay exponentially; however where the number of bits which are available to store the value in the array at any angle is small (e.g. 4 bits) use of linear decay may be more appropriate. The rate of decay may be fixed or may be dependent on other factors, such as whether the image capture device is stationary or moving or based on time of day. In an example, where the directional capture device is moving, which may be detected using an accelerometer or a position sensor (e.g. a GPS receiver), the rate of decay may be increased compared to where the capture device is stationary. Where the capture device is moving, the scene at any particular pointing angle is likely to change more rapidly than when the capture device is not moving. Any suitable means of determining whether the directional capture device is moving/stationary may be used. In another example, the rate of decay applied may be dependent on the speed with which the capture device is moving, with faster movement resulting in a larger rate of decay.

Figure 8:
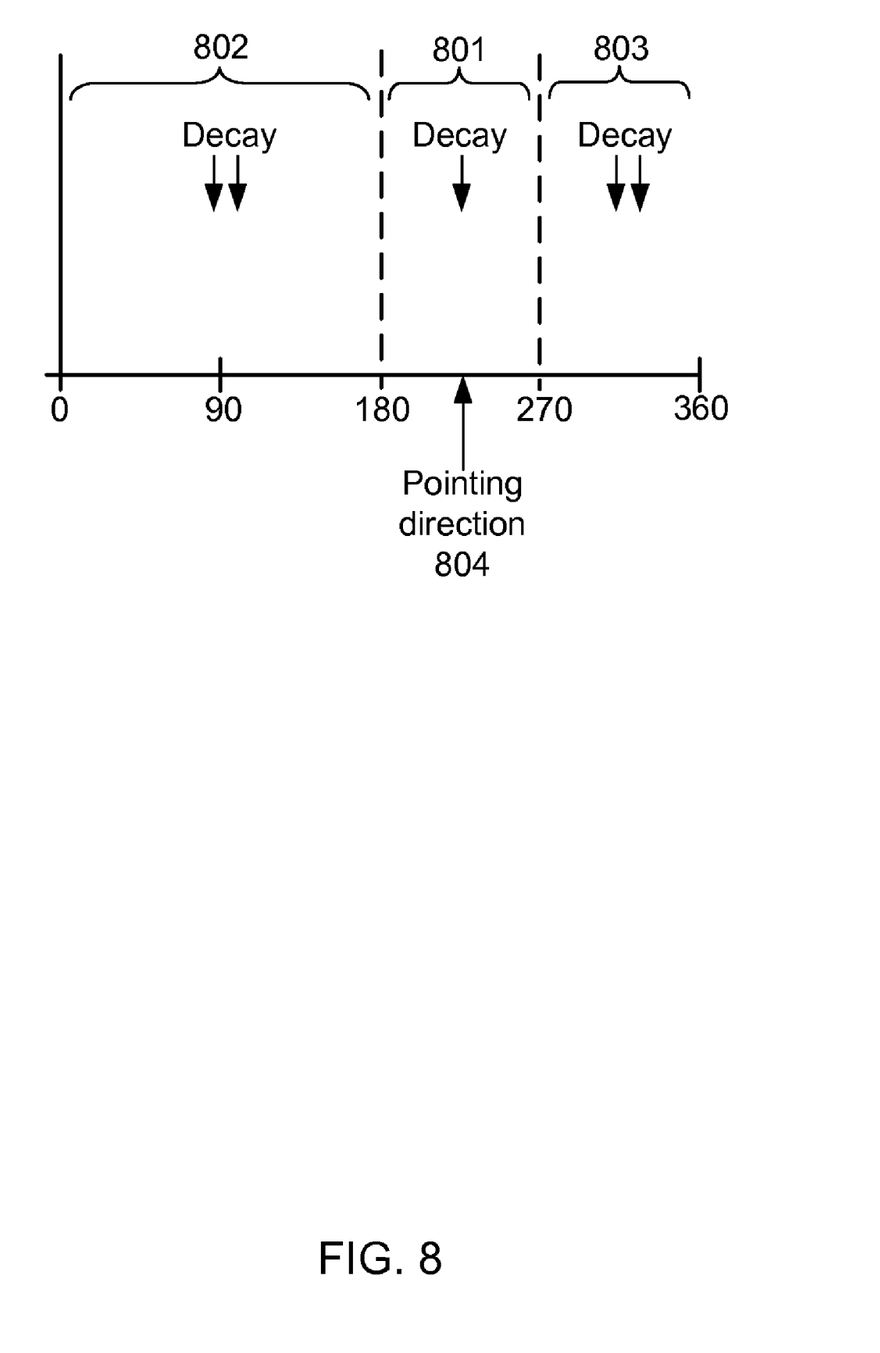

In the examples described above, the same rate of decay is applied to all angles. However, in some examples, the rate of decay applied may be may be direction specific, as shown in FIG. 8. In this example, the rate of decay which is applied may be dependent upon the current pointing direction of the device. For example, a range of angles which are considered to be currently in front of the device 801 i.e. in the current field of view (e.g. a range of angles around the pointing direction 804) may decay slower than angles which are to the side of the device 802, 803. In a further example, ranges of angles which are considered to be in front of the device and behind the device (e.g. a range of angles around the pointing direction 804 and a range of angles around a direction shifted by 180° from the pointing direction) may decay slower than angles which are to the side of the device.

The direction specific decay may be applied at all times or as a result of trigger events, such as detection that the directional capture device is moving. The use of direction specific decay may be particularly appropriate where the device is in motion, because the view in front of the device will change more slowly than the views to the sides of the device, and enables the capturing of data (such as an image) to be made likely if the pointing direction suddenly changes by turning to the left or right. For example, where the directional capture device is a wearable image capture device and the wearer is walking down a street, the view ahead may change more slowly than the views to either side. When the wearer turns to view a shop in the street (e.g. the pointing direction changes from what was considered 'ahead' to what was considered 'at the side'), due to the direction specific decay, the image capture device is likely to trigger to capture an image of this new view.

When the directional capture device stops moving, the decay may continue to be direction specific or a different decay mode may be used (e.g. the same rate of decay for all angles, a different rate of decay compared to when moving or no decay). As described above, the rate of decay in the direction specific decay may also be dependent on the speed with which the image capture device is moving.

Figure 9:
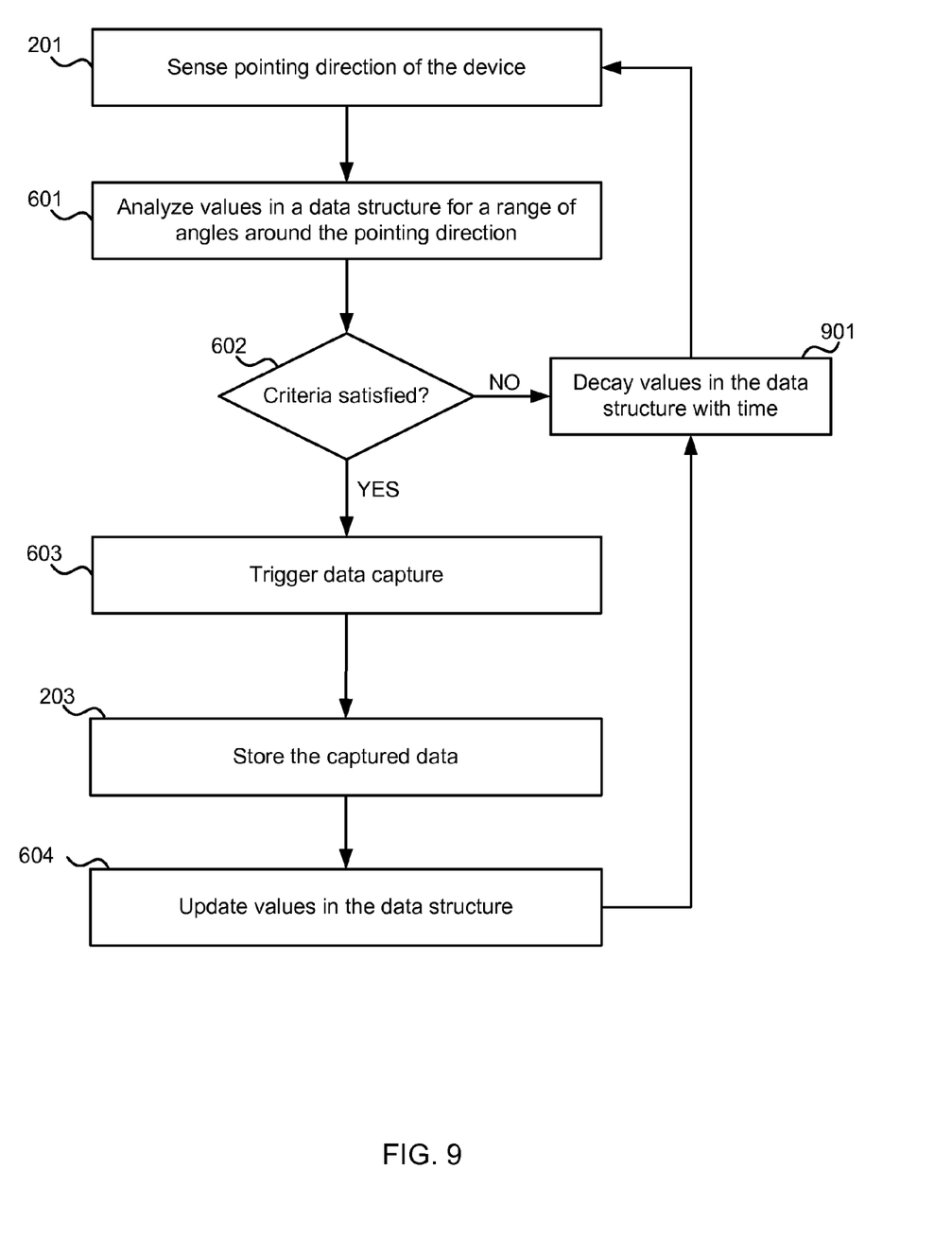
FIG. 9 is a flow diagram of a further example method of operation of a directional capture device.

FIG. 9 shows a flow diagram of an example method of operating of a directional capture device (such as shown in FIGS. 1 and 3) which uses a data structure in which the values decay with time (block 901) as described above. The flow diagram in FIG. 9 is a variation of that shown in FIG. 6 and described above. In another example the method shown in FIG. 9 may be modified to a show any mechanism to update values in the data structure in a manner which is independent of data capture, be it through a decay mechanism, periodic reset, removal of distributions after a defined period etc. In such a modified method, block 901 would be replaced by a method block in which the values in the data structure are updated according to defined criteria or an update algorithm.

The distribution for particular capture data (e.g. for a particular image) may in addition, or instead, be decayed, added to, or otherwise updated for other reasons. For example, where the data captured is an image and the captured image is determined to be of poor quality (e.g. out of focus, poor white balance, too dark/bright etc), the distribution may be decayed at a greater rate or the distribution may be reduced in size (e.g. the distribution may have a smaller initial amplitude than a higher quality image). Instead, or in addition, different distributions may be used for poor quality images (or other poor quality data).

In making the determination of whether to trigger the capture of data, such as a new image, the processor makes the decision based on a number of sets of previously captured data. For example, with an image capture device, the decision is based a number of images which have already been taken and this decision may be based on one or more of the previously taken and stored images. In an example, the decision may be based on all previously captured and stored images or all images captured and stored within a particular time window or at a particular location. This decision is not limited to being based on a comparison of the previous captured image and the current field of view of the image capture device. One method to enable this decision to be based on a number of images (or a number of sets of captured data) is the use of a data structure, as described above, which stores information on the pointing directions which have already been captured; however, other techniques may be used instead or in addition to this.

The metrics based on pointing direction and the trigger conditions described above are provided by way of example only. Different metrics and/or different trigger conditions may be used and multiple metrics and/or trigger conditions may be used by any image capture device.

Figure 10:
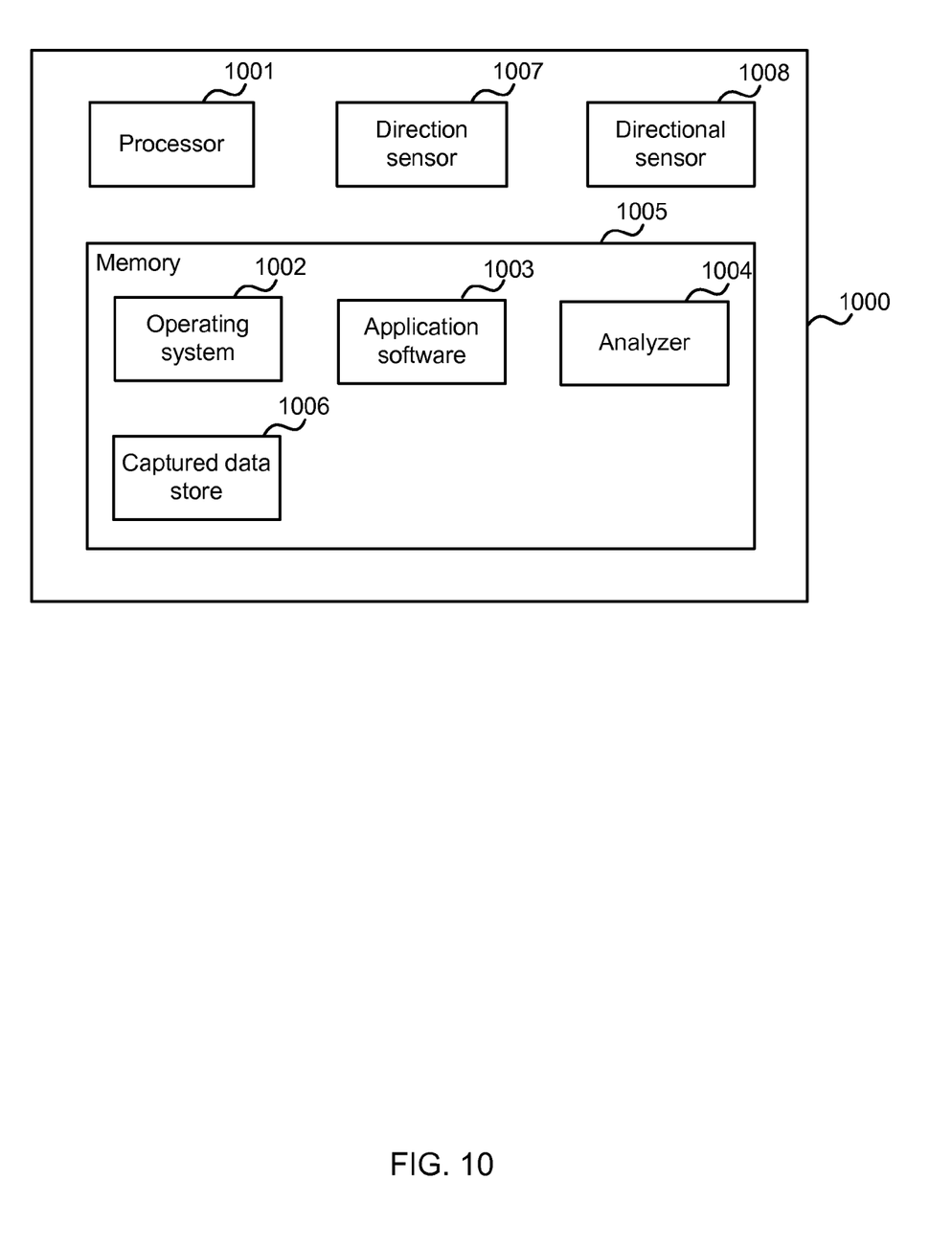
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described above may be implemented. This exemplary computing-based device provides another example of a directional capture device which determines whether to capture data based on the pointing direction of the device.

Computing-based device 1000 comprises one or more processors 1001 which may be microprocessors, controllers or any other suitable type of processors for processing computing executable instructions to control the operation of the device in order to determine when to trigger data capture and to capture data on triggering. In an example, the executable instructions may control the operation of the device in order to determine when to trigger image capture and to capture an image on triggering. Platform software comprising an operating system 1002 or any other suitable platform software may be provided at the computing-based device to enable application software 1003, 1004 to be executed on the device.

The computer executable instructions may be provided using any computer-readable media, such as memory 1005. The memory may be of any suitable type such as random access memory (RAM), a disk storage device of any type such as a magnetic or optical storage device, a hard disk drive, or a CD, DVD or other disc drive. Flash memory, EPROM or EEPROM may also be used. The memory 1005 may be used to store the operating system 1002 and the application software 1003, 1004 which includes the analyzer 1004 which determines when to trigger the capture of data (such as an image) using at least a metric based on pointing direction. The application software 1003 further comprises data capture software (e.g. image capture software), which communicates with a directional sensor 1008 (such as an image sensor). The memory 1005 may also comprise the captured data store 1006.

The computing-based device 1000 also comprises a direction sensor 1007 and a directional sensor 1008 for capturing data. The directional sensor 1008 may be any capture sensor which is not fully omnidirectional. Where the directional capture device is an image capture device, the directional sensor 1008 may be an image sensor. The computing-based device 1000 may also comprise one or more inputs (e.g. inputs of any suitable type for receiving media content, user input, Internet Protocol (IP) input etc) a communication interface and one or more outputs (e.g. an audio and/or video output to a display system integral with or in communication with the computing-based device), not shown in FIG. 10.

As described above, one or more of the direction sensor 1007, the analyzer 1004 and the captured data store 1006 may be located remotely from the device 1000. In such a case, the device may comprise a communication interface (not shown in FIG. 10) to enable communication with the remote components.

Data (such as images) captured using the directional capture devices as described above may be tagged with the pointing direction when the data is captured. This data may then be used subsequently in the display of the captured data and/or as a search term to enable a user to search for captured data.

In a first example, the pointing direction data may be used to determine the transition which is used when displaying images captured by an image capture device. For example, if a first picture is taken towards the North (e.g. with a pointing direction in the range 315°-45°) followed by a picture taken towards the East (e.g. with a pointing direction in the range 45°-135°), the first picture may transition to the second picture by flying off the screen towards the left and/or the second picture may fly in from the right. In another example, the images may be displayed in a virtual environment, using direction based transitions to enable a viewer to walk through along a timeline over which the images (or other data) were captured. Use of such transitions may aid a viewer in orienting the pictures with respect to each other and provide a viewer with an improved visualization as they navigate through a series of media captured over time.

In a second example, the pointing direction data may be displayed along side the images (or other captured data). For example, a compass may be shown in the corner of the display and may rotate according to the pointing direction of an image being displayed.

In another example, the pointing direction data may be used to automatically recreate panoramic views (e.g. views which have a wider field of view than any single captured image). Images which are taken at the same (or a similar location) may be stitched together according to their pointing direction data in order to create up to a 360° view. Images may be aligned along an axis such that the center of each image is placed according to the pointing direction when the image was captured. Blending may be used to smooth the composite image at joins between individual images. The images used to create a panoramic view may be selected so that they were all taken within a particular time period (and/or by the same person), may be selected by a user or may be selected according to any other criteria.

The pointing direction data may be used in a similar manner to create a virtual environment which may subsequently be navigated by a user (e.g. the wearer of the image capture device or a third party). The virtual environment may be created by displaying images according to their associated pointing direction data and, where available, their position data.

The pointing direction data associated with captured data, such as a captured image may be used as a search term, thereby enabling searching for pictures which are facing a particular direction (and which may also have been taken in a certain location or area), e.g. "location: Eiffel tower; direction: South". This may speed up access to a particular picture or enable more intelligent grouping of pictures (e.g. all images taken at a certain position facing the same direction).

Although in the above description, the pointing direction is defined in terms of an angle (which may be defined relative to a compass direction, such as magnetic North) or a compass direction, in other examples the pointing direction may be defined in other ways. For example, the pointing direction may be defined in terms of position or a combination of position and angle. For example, the pointing direction may be defined as 'position, angle' (e.g. 51.855549° N, 0.149647° E, 180°). Where the pointing direction is defined in terms of position as well as angle, the position value may be quantized (e.g. to 10 meters) so that if the image capture device is moved a small distance without any rotation, the pointing direction remains the same (as the field of view of the image capture device may not change significantly). Where the pointing direction is defined in terms of position, the trigger conditions may be defined in terms of a change in position (e.g. a change of 100 meters).

In an example, the directional capture device 100, 300, 1000 (as shown in FIGS. 1, 3 and 10) may be a wearable image capture device, such as SenseCam as developed by Microsoft Research. Such a device may be wearable by a human or animal or may alternatively be fixed (e.g. in/on a vehicle). The direction sensing module may be implemented as an additional module which may be attached to a Sense-Cam or as an integral component of a SenseCam. Where an additional module is used, the additional module may also comprise the processor (which performs the analysis) or this may be integrated within the main module of the SenseCam or performed remotely. Such an additional module may communicate with the main module using a wired or wireless connection.

Although many of the present examples are described and illustrated herein as being implemented in a in an image capture device, the device and system described is provided as an example and not a limitation. The present examples are suitable for application in a variety of different types of data capture systems, which may for example capture images, sound, video, brightness, spectroscopic data etc.

Furthermore, whilst the image capture examples described above relate to an image capture device which can automatically capture images, this is also described as an example and not a limitation. The techniques described above may be implemented in devices which do not capture data (such as images) automatically but instead require user input. For example, the trigger signal generated by the processor (block 202 and as shown in FIG. 1) may comprise a signal to a user (e.g. an audible or visual signal) to initiate data capture (e.g. by pressing a button on the data capture device).

The methods and apparatus described above provide a mechanism to determine when data, such as a new image, should be captured. This technique, which is based on pointing direction, is of low computational intensity, avoids capture of repetitive similar data and enables efficient use of the device resources such as storage and battery power. The minimal processing power required enables the determinations to be made in real time, rather than, for example, capturing images and using post-processing to determine which images can be deleted.

The techniques described above may be used in combination with any other technique, including known techniques. For example, the techniques to trigger image capture as a result of a change in pointing direction may be used in combination with post-processing image analysis. Where a data structure is used to record information about previously captured images, where the post-processing results in the deletion of a previously captured image, the associated distribution for that deleted image may be deleted from the data structure.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device comprising:
    a direction sensing module associated with a directional data capture module; and
    a processor arranged to receive direction data from the direction sensing module, to trigger capture of a data set by the directional data capture module when a metric based on the direction data satisfies a trigger condition, and to access data relating to one or more previously captured data sets,
        wherein the data comprises a sum of distributions, each distribution being associated with a previously captured data set and being centered on a pointing direction associated with the previously captured data set; and wherein each distribution is reduced with elapsed time from data capture.

2. A device according to claim 1, wherein the directional data capture module comprises an image capture module and wherein the data set comprises an image.

3. A device according to claim 1, further comprising the directional data capture module.

4. A device according to claim 1, wherein the metric is further based on the data.

5. A device according to claim 4, wherein the processor is further arranged to update said data after triggering capture of a data set.

6. A device according to claim 1, wherein the device is a portable recall device.

7. A device according to claim 1, further comprising:
    at least one additional sensor;
    and wherein the processor is further arranged to trigger capture of a data set when an output received from the at least one additional sensor satisfies a second trigger condition.

8. A method of capturing data comprising:
    sensing a pointing direction of a directional capture device; and
    initiating capture of a data set by the directional capture device when a metric based on the sensed pointing direction meets specified criteria, comprising:
        analyzing values in a data structure based on the sensed pointing direction, wherein the data structure comprises a set of values, each value being associated with a pointing direction and being dependent on one or more previously captured data sets;
        initiating data set capture if specified criteria are satisfied;
        updating the set of values in the data structure to the sensed pointing direction when data set capture is initiated; and
        reducing one or more of the values in the data structure according to predefined criteria.

9. A method according to claim 8, wherein the directional capture device is an image capture device and wherein the data set comprises an image.

10. A method according to claim 8, further comprising:
    storing the captured data set.

11. A method according to claim 8, wherein reducing one or more of the values in the data structure according to predefined criteria comprises:
    reducing one or more of the values in the data structure with time.

12. A method according to claim 8, wherein one or more of the values in the data structure are reduced with time at a rate which is selected based upon at least one of: a current pointing direction of the directional capture device and a velocity of the directional capture device.

13. One or more tangible device-readable media with device-executable instructions for performing steps comprising:
    detecting a pointing direction of an image capture device;
    triggering capture of an image by the image capture device based on the detected pointing direction; and
    accessing data relating to one or more previously captured images,
        wherein the data comprises a distribution that is reduced with elapsed time from image capture.

14. One or more tangible device-readable media according to claim 13, further comprising device-executable instructions for performing steps comprising:
    storing a captured image.

15. One or more tangible device-readable media according to claim 13, wherein triggering capture of an image by the image capture device based on the detected pointing direction comprises:
    triggering capture of an image based on the detected pointing direction and data representative of pointing directions associated with the one or more previously captured images.

* * * * *